United States Patent [19]
van der Lely

[11] Patent Number: 5,970,911
[45] Date of Patent: Oct. 26, 1999

[54] CONSTRUCTION INCLUDING AN ACCOMMODATION FOR ANIMALS

[76] Inventor: Cornelis van der Lely, 7 Brüschenrain, CH-6300 Zug, Switzerland

[21] Appl. No.: 08/999,632

[22] Filed: Jan. 22, 1998

Related U.S. Application Data

[63] Continuation of application No. PCT/NL97/00278, May 20, 1997.

[30] Foreign Application Priority Data

May 23, 1996 [EP] European Pat. Off. .............. 96201447

[51] Int. Cl.⁶ .................................................. A01J 5/017
[52] U.S. Cl. .................................... 119/14.03; 119/14.02; 119/14.08
[58] Field of Search .............................. 119/14.01, 14.02, 119/14.03, 14.08

[56] References Cited

U.S. PATENT DOCUMENTS

| | | | |
|---|---|---|---|
| 3,174,457 | 3/1965 | Lyttle et al. | 119/670 |
| 4,010,714 | 3/1977 | Notsuki et al. | 119/14.03 |
| 5,070,818 | 12/1991 | Gearn et al. | 119/82 |
| 5,211,132 | 5/1993 | Farina et al. | 119/158 |
| 5,383,423 | 1/1995 | Van Der Lely | 119/673 |

*Primary Examiner*—Thomas Price
*Attorney, Agent, or Firm*—Penrose Lucas Albright

[57] ABSTRACT

An accommodation for animals, such as cows, including a massage member and a brushing member for massaging and brushing animals in a milking compartment wherein the animals are automatically milked. The milking compartment mounts longitudinal guide members on which the massage member and the brushing member can be moved in longitudinal directions relative to the animal while being manipulated to massage and brush the back, hind quarters and sides of the animal while the animal is being milked. The particular type and degree of brushing and/or massaging are customized to whatever is acceptable for the animal and is found to improve the animal's milk production and/or the quality of its milk. Each animal is identified and the massaging and/or brushing is applied in a manner based on parameters such as the time required to complete the milking and milk samples. In cold weather, warm air, water or oil may be applied to the animal from the massage member.

41 Claims, 3 Drawing Sheets

CONSTRUCTION INCLUDING AN ACCOMMODATION FOR ANIMALS

RELATED APPLICATION:

This is a continuation of co-pending International Application No. PCT/NL97/00278, filed May 20, 1997.

FIELD OF INVENTION

The invention relates to an accommodation for animals, such as cows, comprising a milking component and massaging and brushing members.

BACKGROUND OF THE INVENTION

It is important that animals feels at ease in the accommodation, as this may increase the milk production and reduce the percentage of diseases of the animals. Therefore, the invention aims at arranging the accommodation in such a manner that the animals feel at ease therein.

SUMMARY OF THE INVENTION

In accordance with the invention, this will be achieved wherein the accommodation comprises a massage member and a brushing member for automatically massaging or brushing an animal simultaneously and/or alternately. Massaging the animal simulates the milk yield, while the skin of the animal is kept clean by brushing. According to an inventive feature, the massage member is designed so that the animal is massaged automatically at its upper side and/or rear side. Therefore, the invention also relates to an accommodation for animals, such as cows, characterized in that the accommodation comprises a massage member which is designed so that the animal is massaged automatically at its upper side and/or rear side during a time regulated by a computer.

According to an inventive feature, the accommodation comprises at least one milking compartment and the massage member and/or the brushing member are/is disposed on the milking compartment or near thereto so that it is possible to massage or brush the rear end of the animal. In this manner it is possible to milk the animal during massaging or brushing. Therefore, the invention further relates to an accommodation for animals, such as cows, characterized in that the accommodation comprises at least one milking compartment while the massage member and the brushing member are disposed on the milking compartment or near thereto so that it is possible to massage or brush the rear end of the animal.

In order to render the massage as pleasant as possible for the animal, in accordance with a further inventive feature, the massage member comprises a massage element which is made of flexible material, such as synthetic material or rubber. In accordance with a still further inventive feature, it is possible to stimulate animal additionally in that the massage and/or brushing member comprise a device by means of which it is possible, in a cold season, to supply automatically warm air, water or oil during massaging and/or brushing.

In order to have the massage and the brushing carried out automatically, in accordance with a yet further aspect of the invention, the massage member and the brushing member comprise a robot arm construction by means of which it is possible automatically to massage and/or brush the animal from its rear end. According to another inventive feature, the massage element and the brush are disposed near the end of a robot arm construction. In order to ensure that the massage element is capable of adapting itself to the contours of the animal, according to an additional inventive feature, the massage elements are connected to the robot arm construction via a hinge. In accordance with a further inventive feature, the hinge is produced as a ball-and-socket joint comprising stop means with the aid of which the strike which the massage element is allowed to make relative to the robot arm construction is limited.

For the purpose of stimulating the animal even more intensively, according to an inventive feature, the surface of the massage element is produced as a profiled one. In a preferred embodiment in accordance with the invention, the profiled surface is constituted by ribs and/or knobs.

In accordance with a further aspect of the invention, the robot arm construction is disposed near the side of the milking compartment. According to another inventive feature, the robot arm construction is fastened to the frame of the milking compartment. In order to make it possible to massage and/or brush the animal over its entire length, in accordance with an inventive feature, the construction comprises a longitudinal guide means, such as a rail, across which the massage member and/or the brushing member can be moved in the longitudinal direction of the animal. According to an additional aspect of the invention, the massage member is provided with drive means with the aid of which the massage element can be vibrated. In accordance with an inventive feature, there is disposed, near the end of the robot arm construction, a rotatably driven brush. According to again another inventive feature, the massage element and a brush are capable of being driven at a variable speed. In order to make it possible that the animal is massaged and/or brushed on both sides, according to an inventive features, on both sides of the milking compartment massage members and/or brushing members are arranged.

In accordance with a further inventive feature, the construction comprises a computer which establishes whether animal has much or little need for being massaged or cleaned by brushing for a short or long time. According to another inventive feature, the construction comprises a computer which has been programmed so that it is known whether the cow will be milked more or less quickly when being brushed or massaged or not. According to again another inventive feature, the construction comprises a computer which has been programmed so as to record whether massaging has a more favorable influence on the cow than brushing. According to an additional aspect of the invention, the construction comprises a computer which has been programmed so that it is possible to establish, on the basis of milk samples, whether the massage and/or the brushing are producing satisfactory results.

According to an other aspect of the invention, the rear side of the animal can be massaged by means of an element which is driven in a hyperbolically rotating manner.

The invention further relates to a method of stimulating the milk yield of an animal to be milked, in which method, after a animal has occupied a compartment, the animal will optionally first be massaged automatically by means of a massage member, or the animal will be massaged and brushed at the same time. According to a further aspect of the invention, during massaging and/or brushing an animal, teat cups are connected to the teats of the animal to be milked and the animal is subsequently milked. It has appeared that brushings and/or massagings result in a quicker initiation of milk flow from the animal. According to an inventive feature, the teat cups are automatically connected to the teats of an animal to be milked by means of a milking robot. According to a further inventive feature, by means of the massage member the animal is massaged beside the udder, preferably in front thereof. In accordance with an aspect of the invention, the massage member massages the rear end of the animal. According to an inventive feature, the brush is moved from the upper side of the back of an animal downwardly to the abdomen of the animal. According to an aspect of the invention, after the brush has reached the abdomen of the animal, the number of revolutions at which the brush is rotating is automatically increased and the brush is subsequently moved back along the animal to the upper side of its back. In accordance with an inventive feature, the brushing member is automatically moved in the longitudinal direction of the animal for the purpose of brushing the animal stripwise. According to again another inventive feature, the computer defines the duration of the massage depending on the type of animal.

For a better understanding of the invention, reference will now be made to the accompanying drawings, in which:

DETAILED DESCRIPTION OF THE PREFERRED EMBODIMENTS

Figure 1:
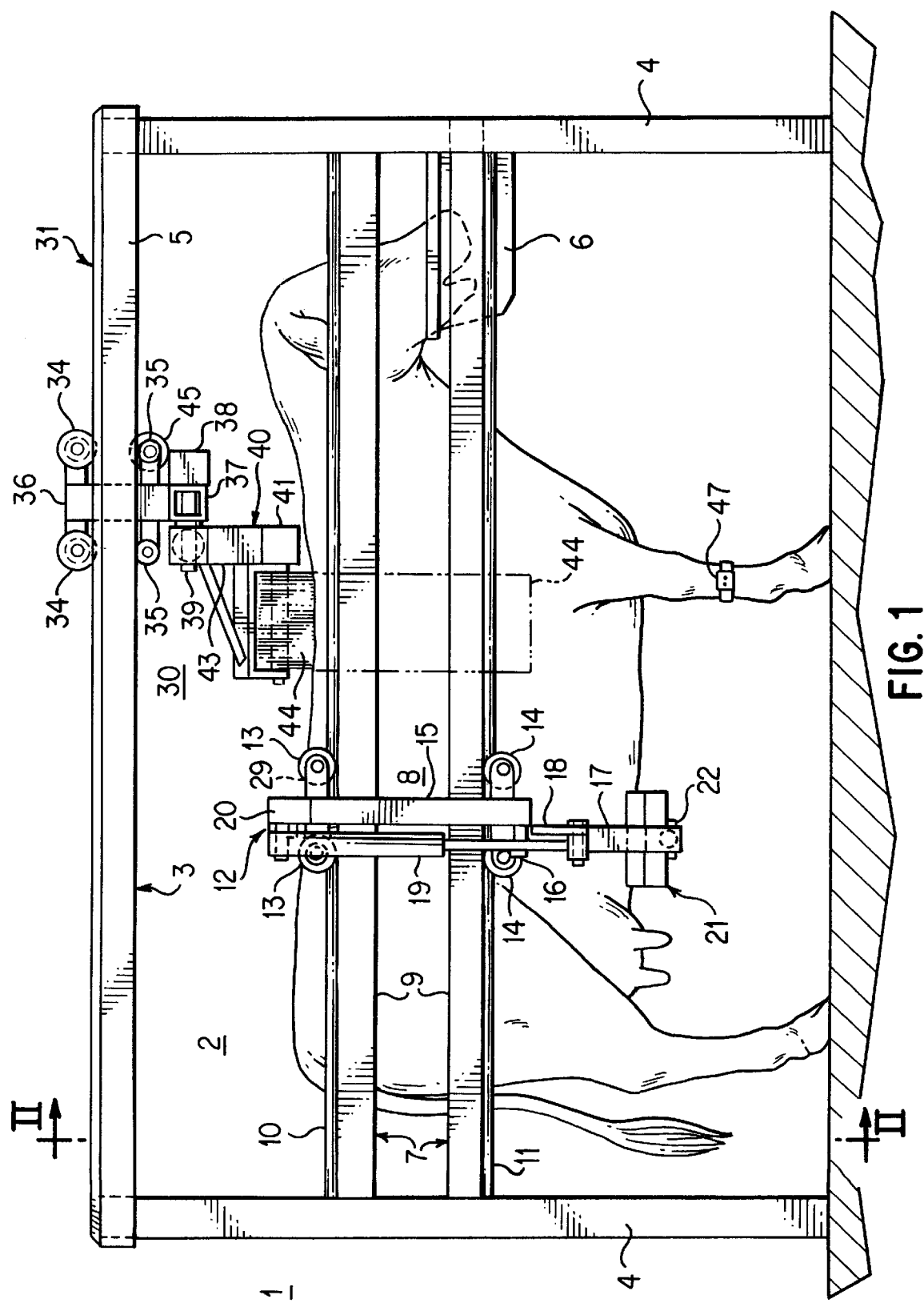
FIG. 1 is a side elevational view of a milking compartment in which there are disposed massage members and brushing members.
Figure 2:
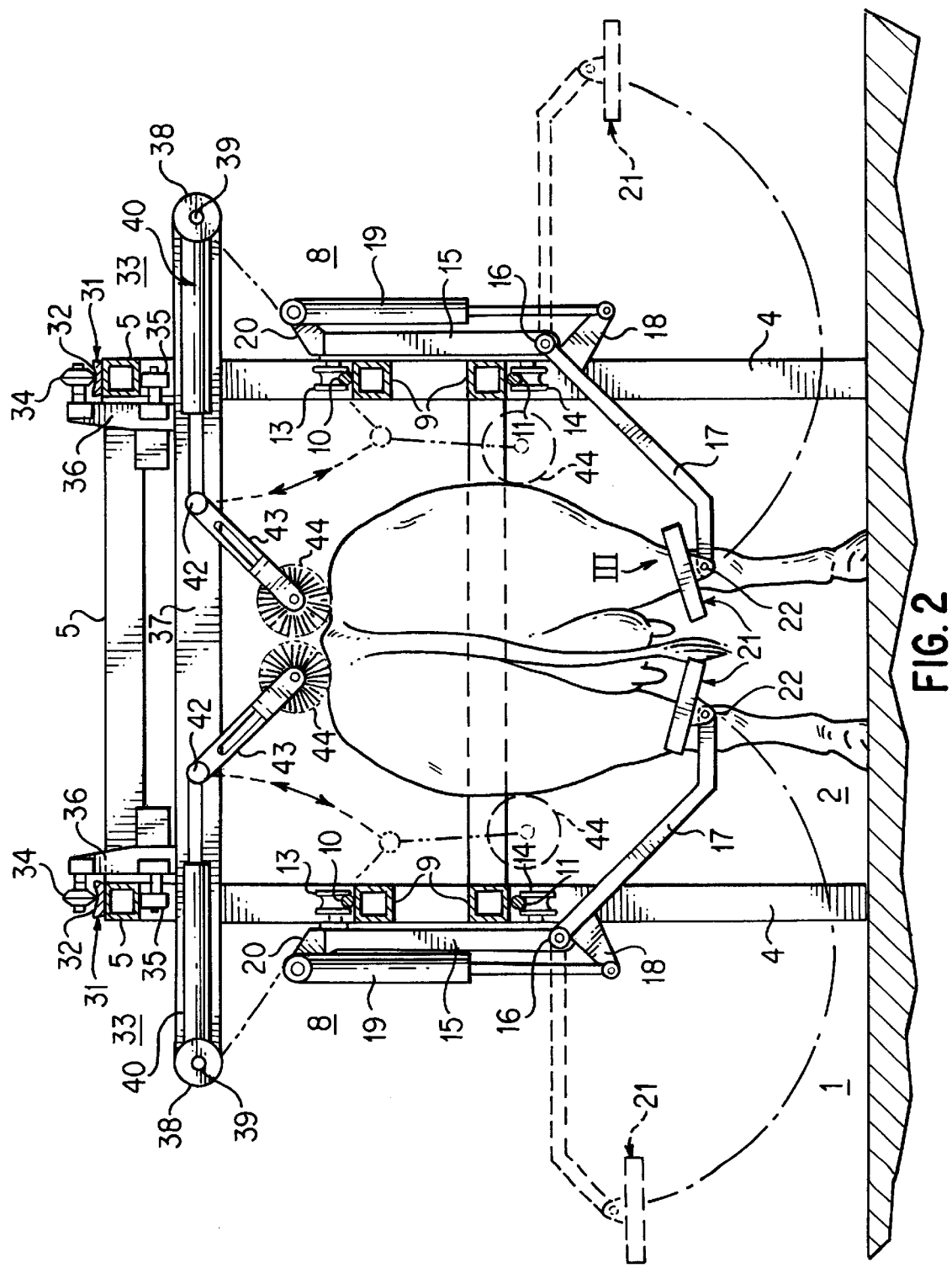
FIG. 2 is a rear sectional elevational view of the milking compartment taken on line II—II in FIG. 1.

FIG. 1 shows a side view of an accommodation 1 for animals in which there is disposed a compartment 2. Compartment 2 comprises a frame 3 including stands 4 and joists 5 (FIGS. 1 and 2). On frame 3 there is further disposed a feed trough 6 in which fodder, such as concentrate, is dispensed to the animals in compartment 2 by means of a concentrate rationing system (not shown). Compartment 2 is further provided with an animal identification system (not shown) by means of which an animal can be identified. For that purpose the animals are provided with a band 47 disposed around a forward leg, which band 47 comprises a responder that communicates with the animal identification system.

Figure 3:
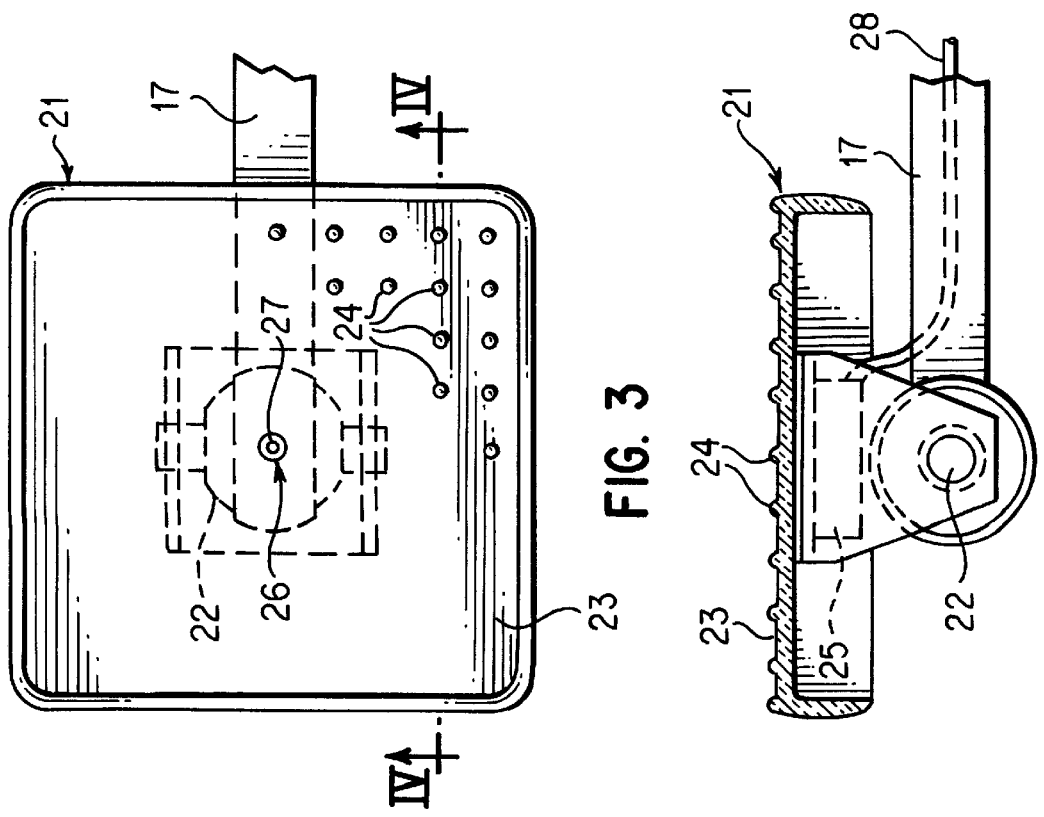
FIG. 3 shows to an enlarged scale a plan view of a massage element as seen from the direction of arrow III in FIG. 2.
Figure 4:
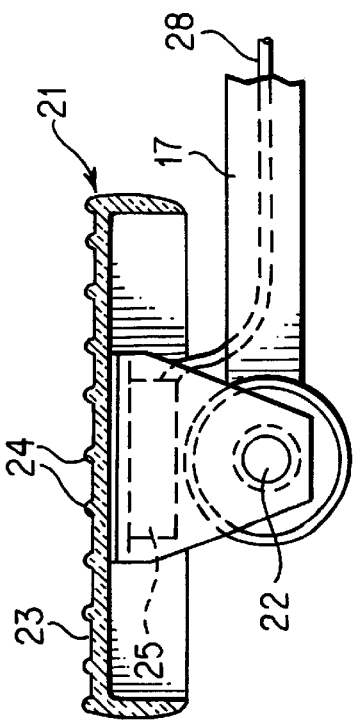
FIG. 4 is a cross-section of the massage element taken line IV—IV in FIG. 3.

Between the stands 4, on both side of compartment 2 at approximately one-half the height of compartment 2, a longitudinal guide means 7 is disposed for supporting a massage member 8. The longitudinal guide means 7 comprises two spaced apart box girders 9, of which the upper box girder 9 is provided at its upper side with a profiled edge 10 and the lower box girder 9 is provided at its lower side with a profiled edge 11. Disposed on longitudinal guides means 7 is a robot arm construction 12 for massage member 8. By means of an upper pair of wheels 13 and a lower pair of wheels 14 the robot arm construction 12 is suspended so as to be movable across the profiled edges 10 and 11. Between the pairs of wheels 13 and 14 is disposed a vertical beam 15, provided at its lower side with an arm 17 that is pivotable about a horizontal shaft 16. Near horizontal shaft 16, pivotable arm 17 is provided with a lever 18, the end of which is rotatably coupled with a vertically arranged piston and cylinder unit 19, the other end of which is also rotatably connected to a lug 20 fastened to the vertical beam 15. Near its end, arm 17 is provided with a massage element 21. In FIGS. 3 and 4 massage element 21 is shown to an enlarged scale. Massage element 21 is connected to arm 17 via a ball-and-socket joint 22. Ball-and-socket joint 22 is provided with blocking means (not shown), with the aid of which the stroke which massage element 21 is allowed to make relative to arm 17 is limited. Massage element 21 comprises a square massage plate 23 made of a flexible material, such as rubber or synthetic material. Massage plate 23 is provided at its upper side with knobs 24. Massage element 21 can be vibrated by means of a drive 25 disposed under massage plate 23. Massage member 8 is further provided with a spraying device 26 by means of which warm or cold air, water or oil can be supplied to massage element 21. The spraying device 26 comprises a spraying nozzle 27 disposed in the center of massage plate 23. Via a line 28 disposed in arm 17 the warm or cold air, water, or oil can be supplied to spraying nozzle 27.

By means of the piston and cylinder unit 19, massage element 21 can be pivoted from its position outside the compartment indicated by broken lines in FIG. 2 to under the abdomen of animal. By means of a motor 29 disposed on the upper pair of wheels 13, massage member 8 can be moved in the longitudinal direction of milking compartment 2 along longitudinal guide means 7. It is thus possible to massage the udder of the animal as desired in the vicinity thereof by means of massage element 21.

As shown in FIGS. 1 and 2, milking compartment 2 is further provided on both sides with a brushing member 30. Brushing member 30 is also movable in the longitudinal direction of milking compartment 2 across a further longitudinal guide means 31 disposed on frame 3 of compartment 2. The further longitudinal guides means 31 comprises a profiled edge 32 disposed on joists 5. Brushing member 30 comprises a further robot arm construction 33 which can be moved across the further longitudinal guide means 31 in the longitudinal direction of milking compartment 2 by means of an upper pair of wheels 34 and a lower pair of wheels 35. Between the upper pair of wheels 34 and lower pair of wheels 35 is arranged a vertically extending box girder 36. At the lower end of box girder 36 is arranged a box girder 37 which is in a horizontal position and extends across and outwardly from either side of milking compartment 2. At the end of horizontal box girder 37 a step motor 38 is arranged which is provided with a horizontal shaft 39, and which is firmly connected with a telescoping arm 40. At the end of the telescoping arm 40 is disposed a second step motor 41 which is also provided with a horizontal shaft 42 connected with a further arm 43. At the end of the further arm 43 there is disposed a rotatably driven brush 44. Brush 44 is driven by a motor (not shown) which is capable of being driven in opposite directions at a variable rpm. By means of the aforementioned step motor and telescoping arm 40, brush 44 can be moved along the trunk of the animal from the position shown in bold lines in FIG. 2 until pivoted into the schematically shown position indicated by dot-dash lines. By means of a step motor 45 disposed on the lower pair of wheels 35 it is possible to move brush member 30 in the longitudinal direction of milking compartment 2.

Figure 5:
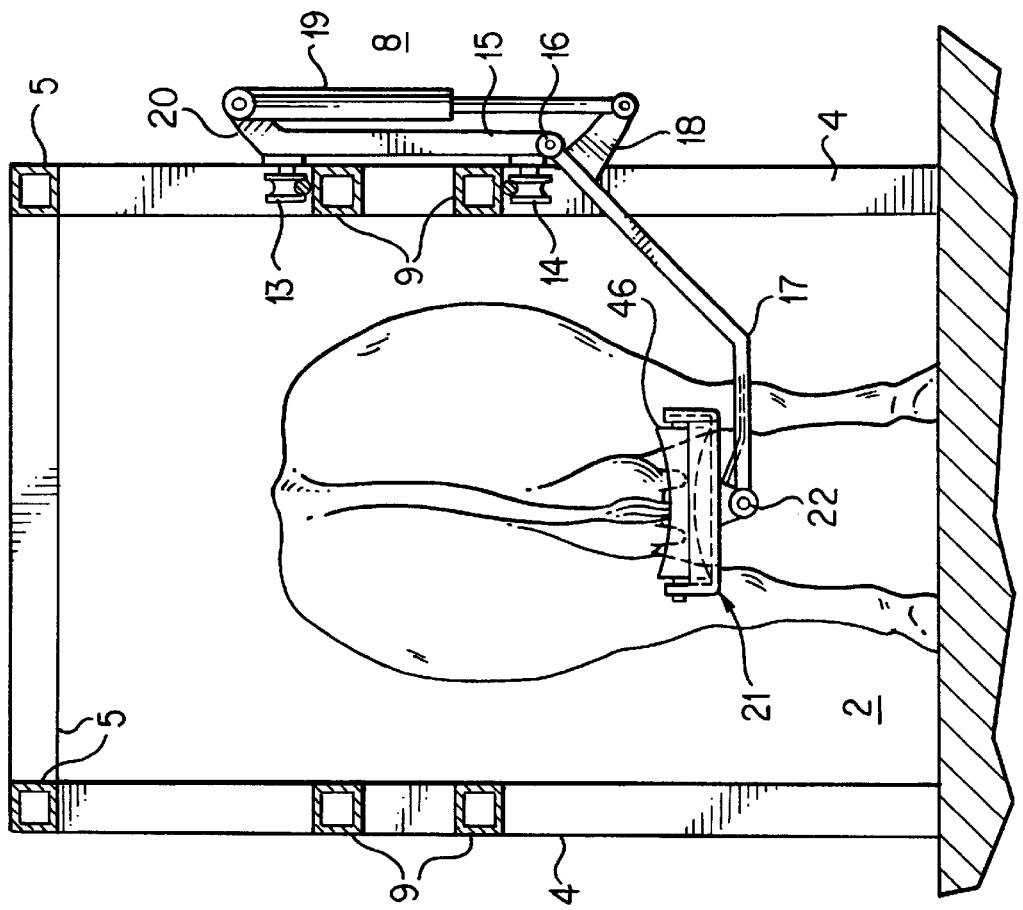
FIG. 5 shows a rear view of an alternative embodiment in which has only one massage member.

FIG. 5 represents a further embodiment of a massage member 8 in accordance with the invention. Elements corresponding with those of the first embodiment are indicated by the same reference numerals. In FIG. 5 the massage element 21 of the massage member 8 is designed as a hyperbolic roller element 46. By means of a motor (not shown) hyperbolic roller element 46 can be driven in opposite directions. With the aid of hyperbolic roller element 46, the rear side of the animal can be massaged. It will also be possible to vibrate hyperbolic roller element 46. In another embodiment (not shown) it is possible as well to move hyperbolic roller element 46 vertically along the rear side of the animal.

Although I have disclosed the preferred embodiments of my invention, it is to be understood that it is capable of other adaptations and modifications within the scope of the following claims:

I claim:

1. An apparatus comprising a compartment for animals, brushing or massaging means, operative means associated with said brushing or massaging means, said brushing or massaging means performing the function of brushing or massaging the animal in said compartment in areas other than its udder and proximate thereto, said operative means controlling the movements of said brushing or massaging means.

2. An apparatus in accordance with claim 1, wherein said operative means comprises a mechanism that automatically massages the upper side of an animal in said compartment while said animal is being milked therein.

3. An apparatus in accordance with claim 1, wherein said operative means automatically massages the underside of an animal in said compartment.

4. An apparatus in accordance with claim 1, wherein said operative means automatically massages the rear side of an animal in said compartment while said animal is being milked therein.

5. An apparatus in accordance with claim 1, wherein said operative means comprises a computer program that controls the function of brushing or massaging an animal in said compartment in areas other than its udder and proximate thereto, the movements of said brushing or massaging means being programmed by said computer to brush or massage an animal in said compartment while said animal is being milked therein.

6. An apparatus in accordance with claim 1, wherein said operative means is mounted on said compartment in a disposition for massaging or brushing the rear parts of the animal.

7. An apparatus in accordance with claim 1, wherein said brushing or massaging means is mounted on said compartment, the apparatus further comprising means for automatically milking an animal in said compartment.

8. An apparatus in accordance with claim 1, wherein said brushing or massaging means comprises a massaging element which is composed of a flexible material.

9. An apparatus in accordance with claim 8, wherein said flexible material comprises a synthetic material.

10. An apparatus in accordance with claim 8, wherein said flexible material comprises rubber.

11. An apparatus in accordance with claim 1, comprising a supply of a warm fluid and means for automatically causing said warm fluid to flow onto an animal in said compartment while the animal is being brushed or massaged in said compartment.

12. An apparatus in accordance with claim 1, wherein said operative means comprises a robot arm construction for moving said brushing or massaging means so that it automatically brushes or massages an animal in said milking compartment automatically from the head to the rear end of the animal.

13. An apparatus in accordance with claim 12, wherein said brushing or massaging means is on the outer aspect of said robot arm construction.

14. An apparatus in accordance with claim 13, wherein said robot arm construction comprises a hinge which is constructed and arranged so that said brushing and massaging means adapts itself to the unevenness of the body of an animal in said compartment.

15. An apparatus in accordance with claim 14, wherein said hinge comprises a ball-in-socket joint which includes stop means to limit the hinged movement of said brushing or massaging means relative to said robot arm construction.

16. An apparatus in accordance with claim 1, wherein said operative means comprises a profiled surface.

17. An apparatus in accordance with claim 16, wherein said profiled surface comprises knobs.

18. An apparatus in accordance with claim 16, wherein said profiled surface comprises ribs.

19. An apparatus in accordance with claim 1, wherein said compartment comprises a milking compartment and said operative means comprises a robot arm construction which is disposed proximate longitudinal side of said milking compartment.

20. An apparatus in accordance with claim 19, wherein said milking compartment comprises a frame and said robot arm construction is fastened to said frame.

21. An apparatus in accordance with claim 1, comprising a rail extending along said compartment, said operative means being movable along said rail.

22. An apparatus in accordance with claim 1, wherein said operative means comprises drive means for vibrating said brushing or massaging means.

23. An apparatus in accordance with claim 1, wherein said operative means comprises a robot arm construction and said brushing or massaging means comprises a rotatable driven brush which is connected to said robot arm construction proximate its end.

24. An apparatus in accordance with claim 1, wherein said operative means comprises a variable speed motor for driving said brushing or massaging means.

25. An apparatus in accordance with claim 1, wherein said compartment is provided with opposite sides, a brushing or massaging means being arranged on each of said opposite sides.

26. An apparatus in accordance with claim 1, wherein said operative means comprises identifying means for identifying an animal in said compartment and a computer program associated with said identifying means for selectively controlling the length of time that said brushing or massaging means brushes or massages the animal in said compartment depending upon the identity of said animal.

27. An apparatus in accordance with claim 1, wherein said operative means comprises identifying means for identifying an animal in said compartment, a computer program associated with said identifying means, milking means for milking the animal in said compartment, said computer program selectively controlling said operative means for selectively brushing or massaging the animal in said compartment depending on how brushing or massaging said animal influences the length of time for milking the animal in said compartment.

28. An apparatus in accordance with claim 1, wherein said operative means comprises identifying means for identifying an animal in said compartment, milking means for milking an animal in said compartment, said operative means further comprising a computer program controlling the brushing or massaging of an animal in said compartment selectively depending upon how said brushing or massaging influences milk production parameters of the animal in said compartment.

29. An apparatus in accordance with claim 1, wherein said operative means comprises a computer program and identifying means for identifying the animal in said compartment, milking means for milking the animal in said compartment and sampling means for sampling milk from such milking, said computer program determining, on the basis of milk samples from the animal in said compartment provided by said sampling means, the influence of brushing or massaging said animal while in said compartment during the milking operation on the quality of milk produced by the animal therein.

30. A method in accordance with claim 1, wherein the animal is being brushed or massaged on its rear parts.

31. A method of stimulating the milk yield of an animal comprising the steps of connecting teat cups to the animal's teats and while said teat cups are being so connected, brushing or massaging the animal by an automatically operated brushing or massaging means.

32. A method in accordance with claim 31, wherein said teat cups are connected to the animal while the animal is being brushed or massaged by an automatically operated brushing or massaging means and said animal is subsequently milked.

33. A method in accordance with claim 31, wherein said teat cups are automatically connected to the animal's teats by a milking robot.

34. A method in accordance with claim 31, wherein the animal is being brushed or massaged proximate its udder.

35. A method in accordance with claim 31, comprising moving a brush from the upper side of the back of the animal until it reaches the abdomen of the animal.

36. A method in accordance with claim 35, wherein said brush is being revolved at a first speed when it is being moved from the upper side of the back of the animal downward until it reaches the abdomen, and then said brush is moved back from the animal's abdomen to its upper side of its back while the brush is being rotated at an increased speed.

37. A method in accordance with claim 31, wherein the brushing or massaging of the animal by an automatically operated brushing or massaging means is controlled by a computer which selectively controls the duration of the brushing or massaging depending upon the identity of the animal being so brushed or massaged.

38. An apparatus comprising a milking compartment for animals, automatic milking means for milking an animal in said milking compartment, identifying means for identifying an animal in said milking compartment, moving pressure applying means including a robot arm construction for performing the function of moving said moving pressure applying means against the body of an animal in said milking compartment in areas other than the animal's udder and proximate thereto, a computer program for controlling the movement and pressure of said moving pressure applying means on the body of the animal in said milking compartment, said movement and pressure being selectively controlled by said computer program based on the animal's identity with the objective of improving that animal's milk production.

39. An apparatus in accordance with claim 38, wherein said moving pressure applying means comprises a massage member.

40. An apparatus in accordance with claim 38, wherein said moving pressure applying means comprises a brush.

41. An apparatus in accordance with claim 38, further comprising means for automatically supplying a warm fluid to the animal's body while said moving pressure applying means is moved along the same area of the animal's body that said warm fluid is applied.

* * * * *